(12) United States Patent
Hooker

(10) Patent No.: US 10,406,930 B2
(45) Date of Patent: Sep. 10, 2019

(54) SYSTEM AND METHOD OF AUTHORIZING OFF-LINE ELECTRIC VEHICLE CHARGING STATION

(71) Applicant: General Electric Company, Schenectady, NY (US)

(72) Inventor: John Kenneth Hooker, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/826,848

(22) Filed: Nov. 30, 2017

(65) Prior Publication Data
US 2019/0160957 A1 May 30, 2019

(51) Int. Cl.
*B60L 11/08* (2006.01)
*G06F 1/06* (2006.01)
(Continued)

(52) U.S. Cl.
CPC ....... *B60L 11/1846* (2013.01); *B60L 11/1825* (2013.01); *B60L 11/1848* (2013.01);
(Continued)

(58) Field of Classification Search
CPC . Y02T 90/128; Y02T 90/169; Y02T 10/7005; Y02T 10/7088; Y02T 10/7291;
(Continued)

(56) References Cited

U.S. PATENT DOCUMENTS

| 8,421,592 | B1 | 4/2013 | Gunasekara et al. |
| 9,371,007 | B1 | 6/2016 | Penilla et al. |
| (Continued) | | | |

FOREIGN PATENT DOCUMENTS

| EP | 2562729 A2 | 2/2013 |
| WO | 2013142866 A1 | 9/2013 |

OTHER PUBLICATIONS

European Search Report from corresponding EP Application No. 18208753.6 dated Apr. 4, 2019.

*Primary Examiner* — Dionne Pendleton
(74) *Attorney, Agent, or Firm* — Ziolkowski Patent Solutions Group, SC

(57) ABSTRACT

A charging system for charging an electric vehicle includes a charging station and a charging network server, with the charging network server in network communication with the charging station and a mobile device application. The charging station and the charging network server include computing devices programmed to: store an authorization code at each of the network server and the charging station for authorizing charging of the electric vehicle when the charging station is off-line from the charging network server, process a charging authorization request at the charging network server sent from the mobile device application, transmit the authorization code from the network server to the mobile device application responsive to the charging authorization request and when the charging station is off-line, and authorize or deny charging of the electric vehicle based on whether an authorization code input to the charging station matches the authorization code stored on the charging station.

20 Claims, 4 Drawing Sheets

(51) Int. Cl.
| | |
|---|---|
| *B60L 11/18* | (2006.01) |
| *G07C 9/00* | (2006.01) |
| *B60L 53/65* | (2019.01) |
| *B60L 53/68* | (2019.01) |
| *B60L 53/30* | (2019.01) |
| *G07F 15/00* | (2006.01) |

(52) U.S. Cl.
CPC .............. *B60L 53/305* (2019.02); *B60L 53/65* (2019.02); *B60L 53/68* (2019.02); *G07C 9/00007* (2013.01); *G07F 15/005* (2013.01); *Y02E 60/721* (2013.01); *Y02T 90/128* (2013.01); *Y02T 90/163* (2013.01); *Y04S 30/14* (2013.01)

(58) Field of Classification Search
CPC ....... Y02T 90/121; Y02T 90/14; Y02T 90/16; Y02T 90/162; Y02T 90/163; Y02T 10/7055; Y02T 90/12; G06Q 50/06; G06Q 10/02; G06Q 10/1093; G06Q 20/102; G06Q 20/145; G06Q 20/24; G06Q 20/409; G06Q 30/00; G06Q 30/0206; G06Q 30/0222; G06Q 30/0232; G06Q 30/0238; G06Q 30/0251; G06Q 30/0259; G06Q 30/0283; G06Q 30/0284; G06Q 50/30; B60L 53/305; B60L 53/665; B60L 2240/622; B60L 2240/72; B60L 2260/52; B60L 2260/54; B60L 2260/58; B60L 2270/32; B60L 53/14; B60L 53/63; B60L 53/65; B60L 53/68; B60L 11/1848; B60L 2240/12; B60L 2240/545; B60L 2240/80; B60L 2250/16; B60L 2250/30; B60L 3/12; B60L 53/12; B60L 53/31; B60L 53/60; B60L 53/64; B60L 58/12; Y02D 70/00; Y02D 70/1224; Y02D 70/1244; Y02D 70/1262; Y02D 70/142; Y02D 70/144; Y02D 70/162; Y02D 70/164; Y02D 70/166; Y02D 70/22; Y04S 30/14; Y04S 10/126; Y04S 50/14; G07F 15/005; Y02E 60/721; G01C 21/3476; G01C 21/3492; G06F 1/26; G07B 15/02; G08G 1/144; H01M 10/44; H01M 2220/20; H02J 2007/0096; H02J 7/0021; H02J 7/0027; H04L 25/20; H04L 63/10; H04L 67/10; H04W 4/02; H04W 4/023; H04W 4/046; H04W 4/40

See application file for complete search history.

(56) References Cited

U.S. PATENT DOCUMENTS

| | | |
|---|---|---|
| 2010/0315197 A1* | 12/2010 | Solomon ................. G06F 21/31 340/5.2 |
| 2011/0213656 A1 | 9/2011 | Turner |
| 2013/0110296 A1 | 5/2013 | Khoo et al. |
| 2013/0238536 A1 | 9/2013 | Outwater et al. |
| 2016/0375783 A1 | 12/2016 | Uyeki et al. |
| 2018/0307226 A1* | 10/2018 | Chase .................. G05D 1/0291 |
| 2019/0054835 A1* | 2/2019 | Liang .................. B60L 11/1846 |

* cited by examiner

SYSTEM AND METHOD OF AUTHORIZING OFF-LINE ELECTRIC VEHICLE CHARGING STATION

BACKGROUND OF THE INVENTION

Embodiments of the invention relate generally to electric vehicle charging and, more particularly, to a system and method for authorizing charging of an electric vehicle via an off-line electric charging station.

Electrically powered vehicles, including electric vehicles and plug-in hybrid electric vehicles, provide a zero- or low-emissions solution for transportation in cities and, in the future, are expected to gradually replace the internal combustion engine vehicle as the primary mode of transportation. Electrically powered vehicles include electric motors powered from energy storage devices, such as batteries. As the vehicles operate, the energy storage devices contained therein are depleted. The energy storage devices are commonly recharged at vehicle charging stations to enable further use of the vehicle. Such vehicle charging stations are designed to charge the energy storage device when connected to the vehicle.

In most charging stations, an access control feature is included that regulates a charging operation between the charging station and the vehicle. That is, the access control feature functions to receive information from a potential user (including payment information), authenticate the user, process the payment information, and/or approve or authorize the power delivery to the vehicle. One example of such an access control feature included in early versions of charging stations was an RFID reader incorporated into the charging station. The RFID reader would interact with an RFID card presented by the user in order to receive information from the user. Information on the RFID card could be stored in a memory/local database of the charging station and/or stored on a remote server, with the local/remote database being accessed (such as via the Internet, a LAN, a WAN, cellular, or other network/data connection for the remote database) to transmit/receive user information, authenticate the user, process payment information, and authorize power delivery to the vehicle.

More recently, the access control feature included in charging stations has been in the form of a platform/system that utilizes smartphone (a.k.a. "mobile app") authorization and authentication. To enable such smartphone authorization, the charging station is coupled to at least one server through a network, such as the Internet, a LAN, a WAN, cellular, or other network/data connection, with the server communicating with the charging station to receive user information, authenticate the user, process payment information, and authorize power delivery to the vehicle. While this smartphone authorization access control feature is recognized as a convenient and efficient means for regulating a charging operation between the charging station and the vehicle, it is recognized that such smartphone authorization is enabled only when the charging station is in communication with the server. When the charging station is off-line—with it being known that temporary network outages do occasionally occur—the charging request cannot be authorized, thereby potentially leaving the user stranded and unable to get home if their electric vehicle does not have sufficient charge.

Therefore, it is desirable to provide a charging station and method of interacting therewith that enables smartphone authorization of a charging request even when the charging station is off-line from a remote server. It is further desirable that such an authorization method be secure and resistant to tampering, so as to prevent the unregulated charging of an electric vehicle.

BRIEF DESCRIPTION OF THE INVENTION

In accordance with one aspect of the present invention, a charging system for charging an electrically powered vehicle includes a charging station and a charging network server remote from the charging station and in network communication with the charging station and with a mobile device application. Each of the charging station and the charging network server includes a computing device configured to store, process, and receive data for authorizing charging of the electrically powered vehicle, with the computing devices programmed to store an authorization code at each of the network server and the charging station for authorizing charging of the electrically powered vehicle when the charging station is off-line from the charging network server, process a charging authorization request at the charging network server sent from the mobile device application, transmit the authorization code from the network server to the mobile device application responsive to the charging authorization request and when the charging station is determined to be off-line from the charging network server, and selectively authorize or deny charging of the electrically powered vehicle by the charging station upon inputting of an authorization code to the charging station by a user based on whether the input authorization code matches the authorization code stored on the charging station.

In accordance with another aspect of the present invention, a method for authorizing charging of an electrically powered vehicle from a charging station via a mobile device application is provided. The method includes generating an authorization code at a network server remote from a charging station and transmitting the authorization code from the network server to the charging station, with the authorization code being stored on each of the network server and the charging station. The method also includes processing a mobile device authorization request at the network server sent from a mobile device application, the mobile device authorization request comprising a request for authorizing charging of an electrically powered vehicle from the charging station. The method further includes performing a check at the network server to determine if the charging station is currently in network communication with the network server, sending the authorization code from the network server to the mobile device application when it is determined that the charging station is not currently in network communication with the network server, and comparing, at the charging station, an authorization code input to the charging station by a customer to the authorization code stored on the charging station, with charging of the electrically powered vehicle being authorized or denied based on the comparison.

In accordance with yet another aspect of the present invention, a charging system for charging an electrically powered vehicle is provided the charging system includes a charging station and a charging network server remote from the charging station and in network communication with the charging station and with a mobile device application. Each of the charging station and the charging network server comprises a computing device configured to store, process, and receive data for authorizing charging of the electrically powered vehicle, the computing devices programmed to generate a random numeric or alphanumeric code at the charging station when charging is requested therefrom by a user and when the charging station is off-line from the charging network server, the random numeric or alphanumeric code being displayed to the user. The computing devices are also programmed to transmit the random numeric or alphanumeric code from the mobile device application to the charging network server as part of a charging authorization request, with the authorization code being stored on each of the network server and the charging station. The computing devices are further programmed to process a charging authorization request at the charging network server sent from the mobile device application that includes the random numeric or alphanumeric code therein, with the charging network server running an algorithm on the random numeric or alphanumeric code included in the charging authorization request to generate an algorithmic output. The computing devices are still further programmed to transmit the algorithmic output from the charging network server to the mobile device application and authorize or deny charging of the electrically powered vehicle at the charging station upon inputting of the algorithmic output into the charging station by the user.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a system and method for authorizing charging of an electric vehicle during occurrences when a charging station is off-line. A charging network server generates an authorization code that is stored at the charging station and that is subsequently provided to a mobile device application upon a charging authorization request being made. The authorization code provided to the mobile device application is then entered by a user into the charging station and authorizes a charging operation upon validation of the code by the charging station.

In numerous embodiments, the term "electrically powered vehicle" is used to refer to a vehicle that includes one or more electric motors that are used for propulsion. Energy used to propel electrically powered vehicles may come from various energy storage devices, such as, but not limited to, an on-board rechargeable battery, a capacitor, and/or an on-board fuel cell. In one embodiment, the electrically powered vehicle is a hybrid electric vehicle, which may include both an electric motor and a combustion engine. In another embodiment, an electrically powered vehicle is an electric vehicle, which may include only an electric motor for propulsion. Electrically powered vehicles may capture and store energy generated, for example, by braking. Moreover, some electrically powered vehicles are capable of recharging the energy storage device from a power receptacle, such as a power outlet. Accordingly, the term "electrically powered vehicle" as used herein may refer to any vehicle that includes an energy storage device to which electrical energy may be delivered, for example, via a power grid.

Figure 1:
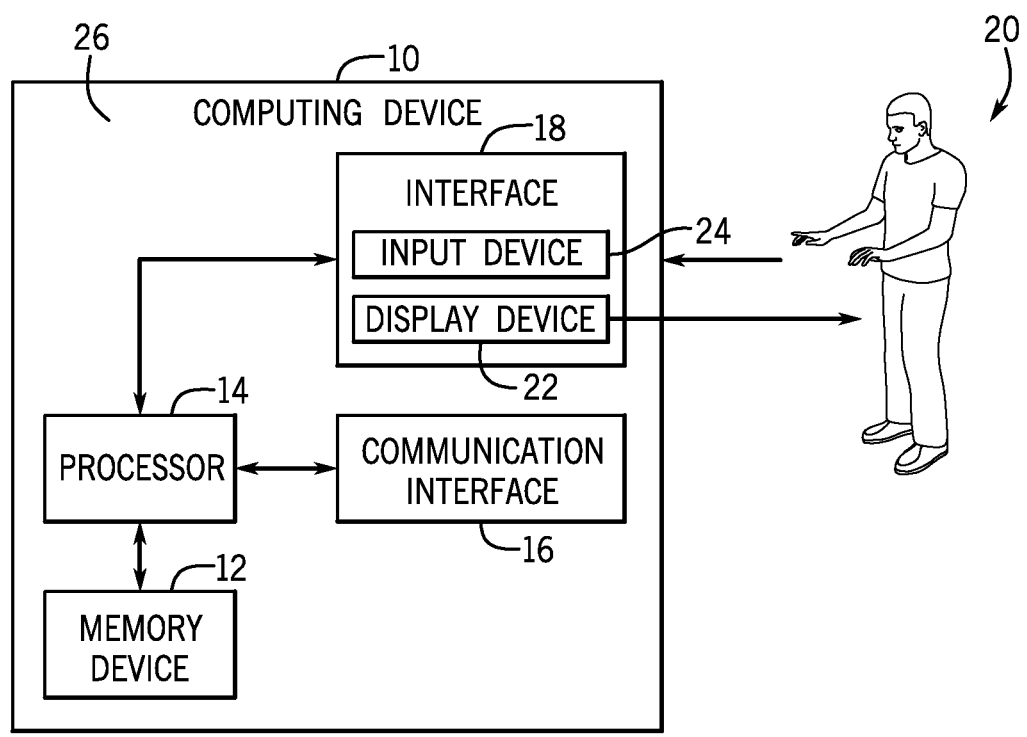
FIG. 1 is a block diagram of an exemplary computing device useable with embodiments of the invention.

Referring first to FIG. 1, an exemplary computing device 10 is illustrated useable with embodiments of the invention. In the exemplary embodiment, computing device 10 includes a memory device 12 and a processor 14 coupled to memory device 12. In some embodiments, executable instructions are stored in memory device 12 and executed by processor 14. Computing device 10 is configurable to perform one or more operations described herein by programming and/or configuring processor 14. For example, processor 14 may be programmed by encoding an operation as one or more executable instructions and providing the executable instructions in memory device 12.

Memory device 12 is one or more devices operable to enable information such as executable instructions and/or other data to be stored and/or retrieved. Memory device 12 may include one or more computer readable media, such as, without limitation, hard disk storage, optical drive/disk storage, removable disk storage, flash memory, non-volatile memory, ROM, EEPROM, random access memory (RAM), etc. Memory device 12 may be configured to store, without limitation, computer-executable instructions, identification numbers, QR codes, barcodes, account information, advertising content, and/or any other type of data. Memory device 12 may be incorporated in and/or separate from processor 14.

Processor 14 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions to perform functions described herein.

Computing device 10 also includes a communication interface 16 coupled to processor 14. Communication interface 16 is configured to be coupled in communication with one or more other devices, such as another computing device 10, a network, etc. Communication interface 16 may include, without limitation, a cellular transmitter/receiver, a serial communication adapter, a wired network adapter, a wireless network adapter, a mobile telecommunications adapter, a radio frequency (RF) receiver, a radio frequency identification (RFID) reader, a Bluetooth adapter, a Wi-Fi adapter, a ZigBee adapter, a near field communication (NFC) adapter, and/or any other device capable of communicating with one or more other devices, etc. Communication interface 16 may transmit information to and/or receive information from one or more different devices, as will be explained in greater detail below.

Further, computing device 10 includes an interface 18 to interact with a user 20, such as an operator of a vehicle. Interface 18 may be configured to display information to a user 20 and receive inputs from the user. In the exemplary embodiment, interface 18 includes a display device 22, such as a cathode ray tube (CRT), a liquid crystal display (LCD), a light-emitting diode (LED) display, an organic LED (OLED) display, an "electronic ink" display, and/or other device suitable to display information. Additionally, or alternatively, interface 18 may include an audio output device (e.g., an audio adapter and/or a speaker, etc.). Interface 18 further includes an input device 24 configured to receive one or more inputs from a user. Input device 24 may include, without limitation, buttons, knobs, keypads, pointing devices, cameras, touch sensitive panel (e.g., a touch pad or a touchscreen), gyroscopes, position detectors, and/or audio inputs (e.g., a microphone). It should be appreciated that computing device 10 may include any number of input devices. In various embodiments, interface 18 is a single component, such as a touchscreen display 26, incorporating both display device 22 and input device 24. In such embodiments, a control or button to solicit a user input may be displayed on the touchscreen display 26, such than the control or button is associated with the input device 24 included in touchscreen display 26.

Figure 2:
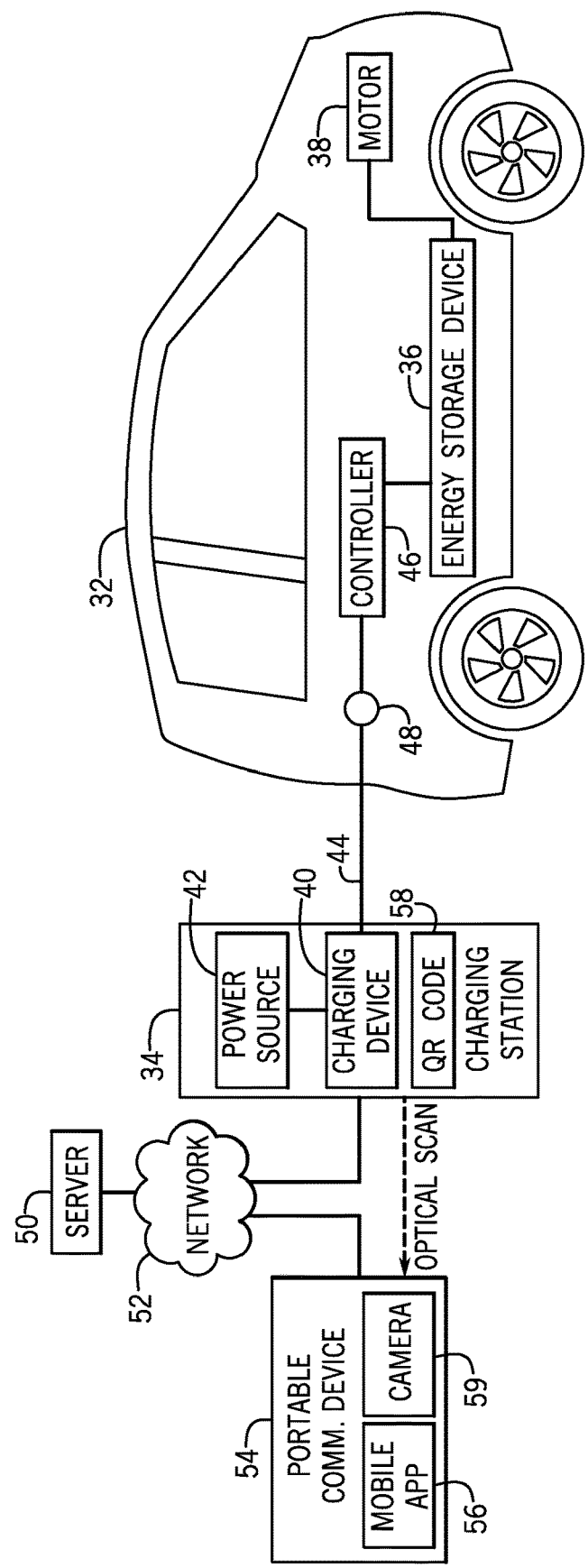
FIG. 2 is a block diagram of an exemplary charging system including a portable communication device, charging station and charging network server 50, according to an embodiment of the invention.

FIG. 2 illustrates an exemplary charging system 30 that may be used to charge an electrically powered vehicle 32. In the exemplary embodiment, system 30 includes a charging station 34 coupled to vehicle 32 to charge an energy storage device 36 included within vehicle 32, such as a battery and/or a capacitor, with the energy storage device 36 being coupled to a motor 38 in vehicle. Moreover, in the exemplary embodiment, charging station 34 includes a charging device 40 and a power source 42 that is coupled to charging device 40. Power source 42 may include a power grid of an electric utility company, a generator, a battery, an inductor, and/or any other device or system capable of providing electricity to charging device 40.

In the exemplary system 30, charging station 34 is coupled to vehicle 32 through a charging conduit 44 configured to transfer power from charging station 34 to vehicle 32. In another embodiment, charging station 34 is wirelessly coupled to vehicle 32 to provide inductive charging of vehicle 32 from charging station 34. In such an embodiment, conduit 44 may be omitted. Regardless of the type of charging employed, energy is generally transferred during a charging process from power source 42 to energy storage device 36 to charge the energy storage device.

In the exemplary embodiment shown in FIG. 2, charging conduit 44 may include at least one conductor for supplying electrical energy to energy storage device 36 and/or to any other component within vehicle 32, and at least one conductor for transmitting information to, and/or receiving information from, a vehicle controller 46 and/or any other component within vehicle 32. Charging conduit 44 may couple to vehicle 32 at a charging receptacle 48. When charging conduit 44 includes at least one power conductor (not shown) and at least one data conductor (not shown), charging receptacle 48 may include an integrated power-data receptacle to connect to both the power and data conductors. Additionally, or alternatively, charging conduit 44 may include a cable with one or more conductors for supplying electricity to vehicle 32, without a separate and dedicated conductor for communicating information to/from vehicle 32. In such an embodiment, information may be embedded in one or more power signals transmitted through charging conduit 44 between vehicle charging station 34 and vehicle 32. In still other embodiments, data may be communicated between vehicle 32 and/or charging station 34 through a wireless connection. Charging receptacle 48 may be configured differently in various embodiments to provide appropriate connections between charging station 34 and vehicle 32.

As shown in FIG. 2, the charging station 34 is coupled in communication with a charging network cloud server 50 (i.e., a "backend" server) through a network 52, with a portable communication device 54 (i.e., mobile device) also being in communication with the cloud server through network. While only a single charging station 34 is shown in FIG. 2, it is recognized that in practice a plurality of charging stations 34 would be coupled in communication with charging network server 50 via network 52. Network 52 may include, without limitation, the Internet, a local area network (LAN), a wide area network (WAN), a wireless LAN (WLAN), a mesh network, a virtual private network (VPN), a cellular network, and/or any other network that enables system 30 to function as described herein. In an exemplary embodiment, portable communication device 54 is an ultra-portable device, such as a smartphone, a cellular phone, a personal digital assistant (PDA), a tablet, etc., that includes a mobile device application 56 thereon. Charging station 34, charging network server 50, and/or portable communication device 54 are examples of computing device 10, and it should be appreciated that charging station 34, charging network server 50, and/or portable communication device 54 may include more or less components than illustrated in the exemplary computing device 10 of FIG. 1.

In performing a charging operation of the electric vehicle under normal conditions where charging station 34 is in communication with charging network server 50, the portable communication device 54—i.e., the mobile app 56 thereon—initiates a charging request by communicating with server, and server then communicates with charging station 34 to authorize the charging event. The charging request from the portable communication device 54 is tied to and associated with a user profile that may include, without limitation, billing and/or contact information for the user, a vehicle identification, a vehicle manufacturer, a vehicle model, an AC profile, a limitation of energy storage device 36, a type of energy storage device 36, and/or other information related to vehicle 32, and/or a charging process, etc. Additionally, the charging request includes an identification of the charging station 34 from which charging is being requested—with the identification of the charging station 34 being performed, in one embodiment, via scanning of an optical machine-readable code 58 by a camera 59 of portable communication device 54, with examples of the code 58 being a QR code or barcode found on the charging station 34. In fulfilling the charging request, the charging network server 50 authenticates and approves the request from the portable communication device 54 and subsequently communicates a charging command to charging station 34 that authorizes the charges request and enables the charging station 34 to fulfill the charging request by providing power to the vehicle 32.

It is recognized, however, that for any of numerous reasons, communications between the charging network server 50 and the charging station 34 may become temporarily interrupted, with the charging station 34 going "off-line" from network 52 such that communication with the charging network server 50 is unavailable. As the charging station 34 is a stationary device, communications with the charging network server 50 may not be immediately restored, and thus it is possible that a charging request communicated to the charging network server 50 via the portable communication device 54 (which may still be on-line due to the mobility thereof) may go unfulfilled because of an inability to transfer a charging command from the charging network server 50 to the charging station 34. The electric vehicle user may thus be left unable to charge their vehicle 32 and potentially stranded if the electric vehicle 32 does not have sufficient charge.

Figure 3:
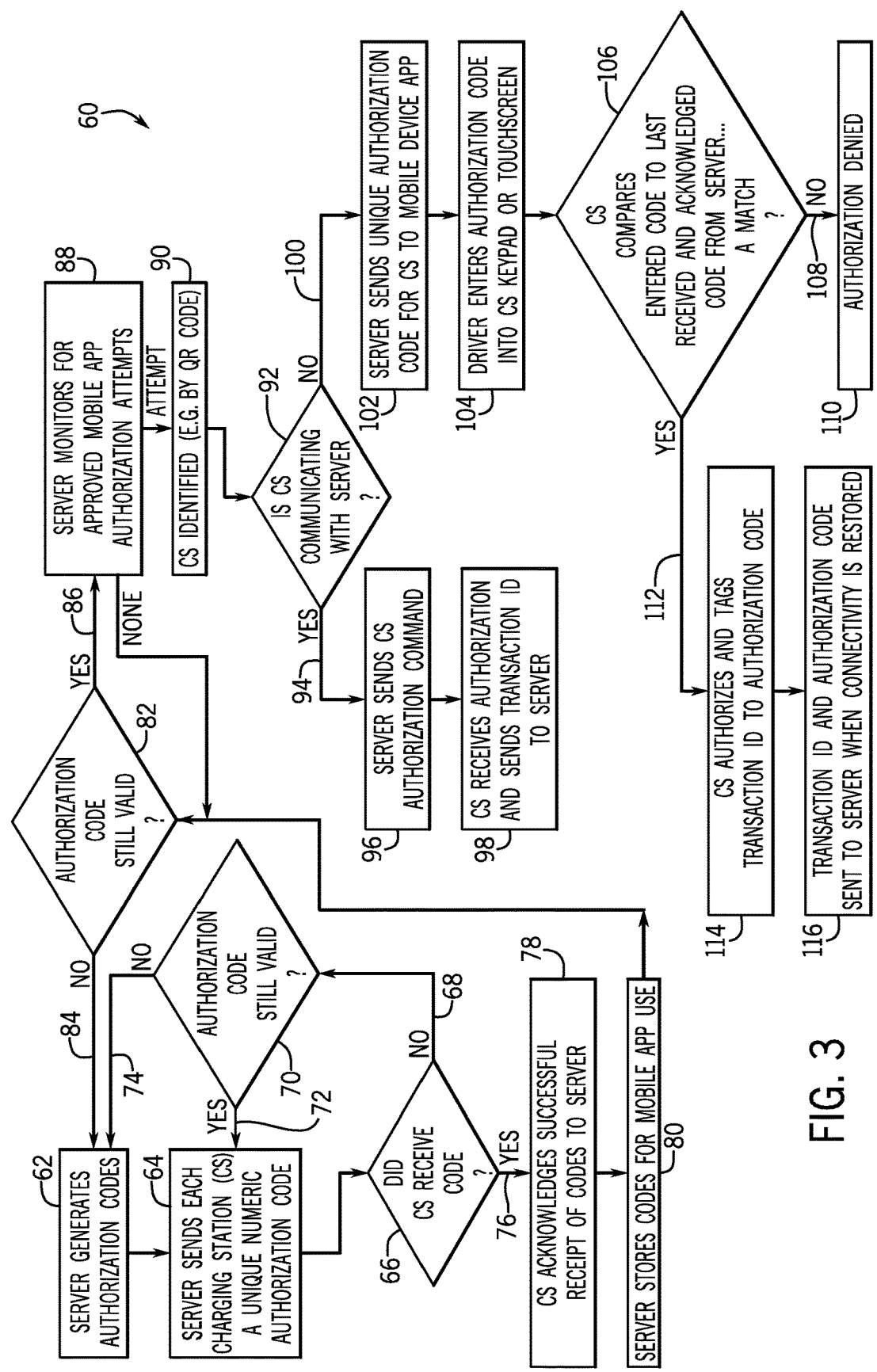
FIG. 3 is a flowchart of a technique for authorizing charging of an electric vehicle via the charging system of FIG. 2, with the charging station being online or off-line from communicating with the charging network server, according to an embodiment of the invention.

FIG. 3 illustrates an exemplary technique 60 for use in charging electrically powered vehicle 32 from charging station 34, with the method providing for charging during periods when the charging station 34 is off-line and communications with the server is interrupted. In implementing the technique 60, it is understood and assumed that the charging station 34 is/was sufficiently in communication with the charging network server 50 at some recent point-in-time prior to a charging request—such that data transfer between the server and the charging station 34 was enabled at that previous time. It is further understood and assumed that the portable communication device 54 (and the mobile app thereon) has network communication with the server to facilitate approval with the charging network server 50—with it being recognized that such communication between the portable communication device 54 and the server might be possible even though communication between the charging station 34 and the server is interrupted, due to the mobility of the portable communication device 54 and the ability to relocate the device to acquire a network signal with the server.

While technique 60 is described with reference to charging system 30, it should be appreciated that technique 60 is not limited to charging system 30 and may be used with other charging system embodiments. In describing the technique 60, reference is made back to FIGS. 1 and 2 to refer to the components of the computing device and charging station 34, as it is recognized that the technique 60 would be implemented by one or more computing devices included in the charging system (i.e., by charging station 34, charging network server 50, and portable communication device 54). The processor 14 of computing device 10 may perform one or more steps directed to data generation and verification and communication interface 16 may facilitate transmission of data between devices in the charging station 34—including the charging station 34, charging network server 50, and portable communication device 54.

As shown in FIG. 3, the technique 60 begins at STEP 62 with generation of an authorization code by the charging network server 50 that will subsequently be used to authorize and confirm a charging request by a user wanting to charge their electric vehicle 32. The authorization code may take any of a number of forms that takes into account security concerns and charging station fleet size, with a numeric code or an alphanumeric code that is difficult to guess and does not limit the fleet size being an exemplary form. Examples of the authorization code may thus include a 6 or 8 character numeric or alphanumeric code that is generated by the charging network server 50. The generated authorization code is then transmitted from the charging network server 50 to a charging station 34 at STEP 64—with the authorization code being a code transmitted to only a single charging station 34.

Upon transmission of the authorization code, a determination is made at STEP 66 as to whether the authorization code transmitted from the charging network server 50 was received by the designated charging station 34. If it is determined at STEP 66 that the authorization code was not received by the charging station 34, as indicated at 68, then the technique 60 continues to STEP 70, where a separate determination is made as to whether the previously generated authorization code is still valid and/or whether generation of a new authorization code is required. That is, according to an exemplary embodiment, the authorization code generated by charging network server 50 is eventually deactivated and made invalid—with such deactivation of the authorization code occurring either upon a use of the authorization code by a user to authorize a charging operation or after a pre-determined amount of time has passed (e.g., 48 hours) since generation of the authorization code by charging network server 50. If it is determined at STEP 70 that the authorization code is still valid, as indicated at 72, then technique 60 loops back to STEP 64—with the server 50 again transmitting the authorization code to the charging station 34. Conversely, if is determined at STEP 70 that the authorization code is no longer valid, as indicated at 74, then technique 60 loops back to STEP 62—with the server 50 generating a new authorization code and then subsequently transmitting the new authorization code at STEP 64.

If it is determined at STEP 66 that the authorization code transmitted by charging network server 50 was received by the charging station 34, as indicated at 76, then the technique 60 continues to STEPS 78 and 80, where charging station 34 acknowledges that the authorization code was received (STEP 78) and charging network server 50 stores the authorization code for future use with a portable communication device 54 (STEP 80). In acknowledging receipt of the authorization code, the charging station 34 stores the authorization code (such as in memory 12) so as to allow for later authentication of the code at a future time and when a user desires charging of their electric vehicle 32 and in the event the charging station 34 is off-line when such a charging request occurs. Similarly, charging network server 50 stores the authorization code so as to provide for transmission of the code at a future time and when a user desires electric charging but the charging station 34 is off-line.

As shown in FIG. 3, technique 60 continues at STEP 82, where a determination is made as to whether the previously generated authorization code is still valid and/or whether generation of a new authorization code is required. That is, as previously described, the authorization code generated by charging network server 50 is eventually deactivated and made invalid—with such deactivation of the authorization code occurring either upon a use of the authorization code by a user or after a pre-determined amount of time has passed since generation of the authorization code by charging network server 50. If it is determined at STEP 82 that the authorization code is not valid, as indicated at 84, then technique 60 loops back to STEP 62—with the charging network server 50 generating a new authorization code and then subsequently transmitting the new authorization code to charging station 34 at STEP 64. Alternatively, if is determined at STEP 82 that the authorization code is still valid, as indicated at 86, then technique 60 continues to STEP 88 with the charging network server 50 monitoring for a charging request for a user desiring charging at the charging station 34. As shown in FIG. 3, while the charging network server 50 monitors for a charging request, the validity of the authorization code continues to be checked, such that a loop between STEPS 84 and 88 is provided until the time that a charging request is received by the charging network server 50.

As previously described, according to an exemplary embodiment, a portable communication device 54 such as a smartphone includes thereon a mobile device app 56 by which a user may make a charging request to engage charging station 34 and utilize the charging station 34 to recharge an electric vehicle. Via the mobile app 56, the portable communication device 54 may interact with the charging network server 50 and the charging station 34 to facilitate authorization and authentication of the charging request, with the portable communication device 54 and the charging network server 50 interacting to transmit/receive user information, authenticate the user, process payment information, and authorize power delivery to the vehicle 32. Thus, at STEP 88, the server monitors for a charging request from an enabled portable communication device 54 as described above.

In receiving a charging request from an enabled portable communication device 54 (via mobile app 56) at the charging network server 50, it is recognized that the charging station 34 from which charging is requested must be identified and this information provided to the charging network server 50 as part of the charging request. According to one embodiment, this charging station 34 information is acquired and provided to charging network server 50 at STEP 90. In one example, the identification of the charging station 34 is performed via scanning of an optical machine-readable code 58, such as a QR code or barcode, found on the charging station 34 by portable communication device 54. In other embodiments, machine-readable code 58 includes a different type of identifier that is unique to charging station 34 and suitable to be scanned, read, and/or understood by portable communication device 54. While identification of the charging station 34 is shown as a separate step (STEP 90) from that of transmission/receipt of a charging authorization request (STEP 88), it is recognized that the two steps may be considered part of a single step of requesting charging authorization.

Upon transmission of a charging request from portable communication device 54 to the charging network server 50 (including user info and charging station info), the technique 60 continues at STEP 92 with a determination of whether the charging station 34 is currently on-line and communicating with the charging network server 50. If it is determined that the charging station 34 is currently communicating with the charging network server 50, as indicated at 94, then technique 60 continues at STEP 96 with the charging network server 50 sending an authorization command to the charging station 34 (assuming that the charging request sent by the user has been approved at the charging network server 50). The charging station 34 then receives the authorization command at STEP 96, enables charging of the electric vehicle 32, and sends a transaction ID back to the charging network server 50 at STEP 98—with the transaction ID providing a record of the charging transaction (including, for example, the amount of charging provided, the cost of the transaction, etc.) that may be provided back to the user. Thus, in an occurrence where the charging station 34 is on-line and in communication with the charging network server 50 at the time a user submits a charging request to the charging network server via the portable communication device mobile app 56, it can be seen that the authorization code generated by the charging network server 50 is not required to authorize a charging request and enable charging—as such steps can be performed via direct communication between the charging network server 50 and the charging station 34.

Referring back to STEP 92, if it is determined that the charging station 34 is off-line and not currently communicating with the charging network server 50, as indicated at 100, then technique 60 continues at STEP 102 with the charging network server 50 sending the authorization code to the portable communication device 54. As indicated previously, it is likely that even in instances where the charging station 34 is off-line and not currently communicating with the charging network server 50, the portable communication device 54 may still be on-line and in communication with the server 50. Accordingly, the charging network server 50 should be able to successfully send the authorization code to the portable communication device 54.

Upon receiving the authorization code at portable communication device 54, the user enters the authorization code into the charging station 34 at STEP 104. According to embodiments of the invention, the authorization code may be entered via the input device 24 included on the charging station 34—with the input device 24 comprising a keypad or touchscreen according to exemplary embodiments, although it is recognized that buttons, knobs, and/or audio inputs (e.g., voice recognition) could also be employed to enter the authorization code.

The charging station 34 functions at STEP 106 to compare the authorization code entered by the user to the authorization code stored in the memory 12 of the charging station 34 that was previously received from charging network server 50 (as performed at STEP 80). If it is determined that the authorization code entered by the user does not match the authorization code stored in the memory 12 of the charging station 34, as indicated at 108, then the technique 60 continues at STEP 110 by denying authorization and approval for performing a charging operation. That is, the charging station 34 will deny authorization and thus prevent the user from receiving a charging power from the charging station 34 to recharge the electric vehicle 32. Conversely, if it is determined at STEP 106 that the authorization code entered by the user matches the authorization code stored in the memory 12 of the charging station 34, as indicated at 112, then the technique 60 continues at STEP 114 with the charging station 34 authorizing a charging operation. In authorizing a charging operation to enable the user to receiving a charging power from the charging station 34 to recharge the electric vehicle 32, the charging station 34 tags the charging operation with a transactional ID that provides a record of the charging transaction (including, for example, the amount of charging provided, the cost of the transaction, etc.) that may be provided back to the user. The transactional ID is stored by the charging station 34, such as in memory 12, until communication is restored, such that charging session data is retained until it can be later transmitted to the charging network server 50.

Upon authorizing the charging operation and tagging the charging operation with a transactional ID, the technique 60 continues at STEP 116 with the charging station 34 monitoring for connectivity with the charging network server 50. Upon communication with the charging network server 50 being restored and the charging station 34 being back on-line, the charging station 34 transmits the transaction ID and the authorization code to the charging network server 50 such that the transaction can be recorded/stored at the server and finalized by charging the user's account for the charging operation that was performed.

Figure 4:
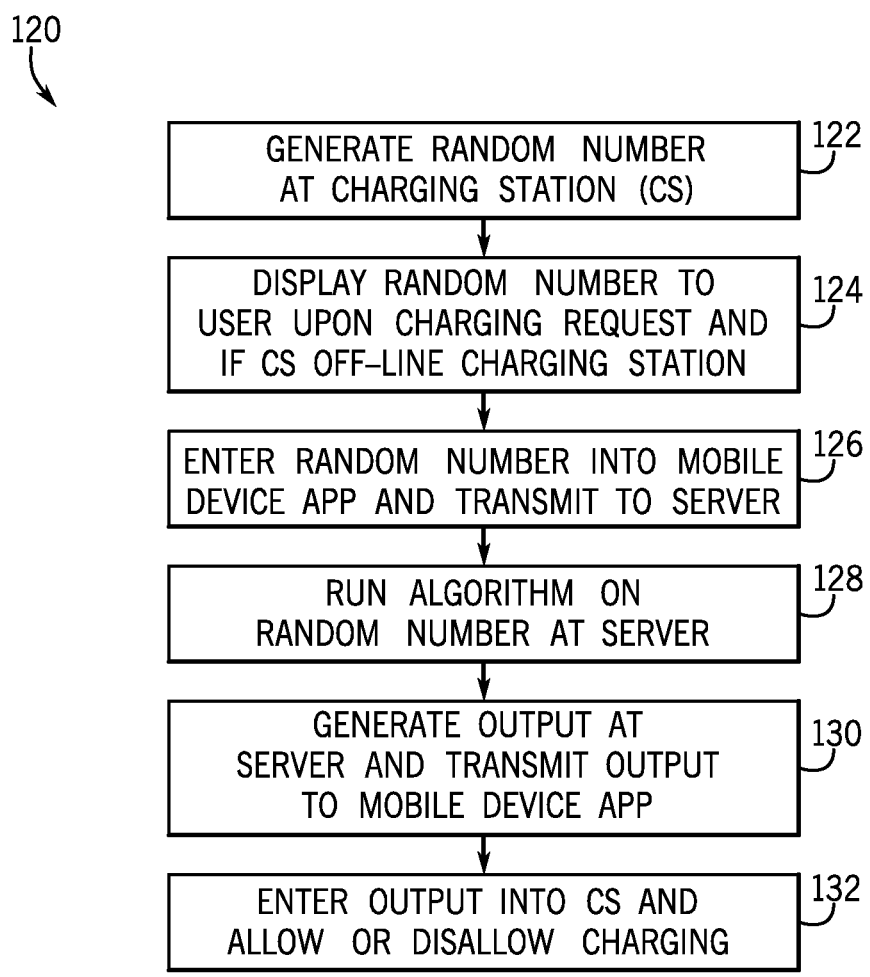
FIG. 4 is a flowchart of a technique for authorizing charging of an electric vehicle via the charging system of FIG. 2, with the charging station being off-line from communicating with the charging network server, according to another embodiment of the invention.

Referring now to FIG. 4, another technique 120 for use in charging electrically powered vehicle 32 from charging station 34 is provided, with the method providing for charging during periods when the charging station 34 is off-line and communications with the server is interrupted. In implementing the technique 120, it is understood and assumed that the portable communication device 54 (and the mobile app 56 thereon) has network communication with the charging authorization server 50 to facilitate approval with the charging network server 50—with it being recognized that such communication between the portable communication device 54 and the server might be possible even though communication between the charging station 34 and the server 50 is interrupted, due to the mobility of the portable communication device 54 and the ability to relocate the mobile device to acquire a network signal with the server.

While technique 120 is described with reference to charging system 30, it should be appreciated that technique 120 is not limited to charging system 30 and may be used with other charging system embodiments. In describing the technique 120, reference is made back to FIGS. 1 and 2 to refer to the components of the computing device and charging station 34, as it is recognized that the technique 120 would be implemented by one or more computing devices included in the charging system (i.e., by charging station 34, charging network server 50, and portable communication device 54). The processor 14 of computing device 10 may perform one or more steps directed to data generation and verification and communication interface 16 may facilitate transmission of data between devices in the charging station 34—including the charging station 34, charging network server 50, and portable communication device 54.

As shown in FIG. 4, the technique 120 begins at STEP 122 with the charging station 34 generating a random-number thereat. At a time when the charging station 34 is off-line and a user tries to interact with the charging station to provide charging to an electrically powered vehicle 32, the charging station displays the random number to the user at STEP 124. The user then enters the random number into the mobile device app 56 at STEP 126 and the random number is then transmitted to the charging network server 50 as part of a charging authorization request sent from the mobile device app 56 to the charging network server 50. Upon receiving the random number from the mobile device app 56, the charging network server 50 runs an algorithm stored thereon (e.g., in memory 12) at STEP 128—with the algorithm being run on the random number. Upon running the algorithm, the charging network server 50 generates an algorithmic output or result at STEP 130 and transmits the algorithmic output back to the mobile device app 56, such that it is accessible by the user. According to embodiments of the invention, the algorithmic output provided to the mobile device app 56 may be a numeric or alphanumeric code, or another type of output/result that may be subsequently entered into or provided to the charging station 34. At STEP 132, the user then enters the output into the charging station. Since the algorithm stored on charging network server 50 is also known to (i.e., stored on) the charging station 34, the charging station 34 is able to allow or disallow charging upon processing the output/result (e.g., code) that was entered thereto by the user.

Beneficially, embodiments of the invention thus provide an electric vehicle charging system and method of interacting therewith that enables mobile device authorization of a charging request even when the charging station is off-line from a remote server. The authorization of the charging via a authorization code that is transmitted from the server to the mobile device of a user ensures that the charging operation is a secure transaction and makes the charging station resistant to tampering, so as to prevent the unregulated charging of an electric vehicle.

A technical effect of the methods, systems, and apparatus described herein is that a computer implemented technique is provided that includes at least one of (a) determining when a vehicle charging station is off-line from a charging network server, (b) providing an authorization code to a mobile device application, and (c) authorizing a charging operation based on a comparison of an authorization code input to the charging station to the authorization code stored on the charging station.

Therefore, according to an embodiment of the invention, a charging system for charging an electrically powered vehicle includes a charging station and a charging network server remote from the charging station and in network communication with the charging station and with a mobile device application. Each of the charging station and the charging network server includes a computing device configured to store, process, and receive data for authorizing charging of the electrically powered vehicle, with the computing devices programmed to store an authorization code at each of the network server and the charging station for authorizing charging of the electrically powered vehicle when the charging station is off-line from the charging network server, process a charging authorization request at the charging network server sent from the mobile device application, transmit the authorization code from the network server to the mobile device application responsive to the charging authorization request and when the charging station is determined to be off-line from the charging network server, and selectively authorize or deny charging of the electrically powered vehicle by the charging station upon inputting of an authorization code to the charging station by a user based on whether the input authorization code matches the authorization code stored on the charging station.

According to another embodiment of the invention, a method for authorizing charging of an electrically powered vehicle from a charging station via a mobile device application is provided. The method includes generating an authorization code at a network server remote from a charging station and transmitting the authorization code from the network server to the charging station, with the authorization code being stored on each of the network server and the charging station. The method also includes processing a mobile device authorization request at the network server sent from a mobile device application, the mobile device authorization request comprising a request for authorizing charging of an electrically powered vehicle from the charging station. The method further includes performing a check at the network server to determine if the charging station is currently in network communication with the network server, sending the authorization code from the network server to the mobile device application when it is determined that the charging station is not currently in network communication with the network server, and comparing, at the charging station, an authorization code input to the charging station by a customer to the authorization code stored on the charging station, with charging of the electrically powered vehicle being authorized or denied based on the comparison.

According to yet another embodiment of the invention, a charging system for charging an electrically powered vehicle is provided the charging system includes a charging station and a charging network server remote from the charging station and in network communication with the charging station and with a mobile device application. Each of the charging station and the charging network server comprises a computing device configured to store, process, and receive data for authorizing charging of the electrically powered vehicle, the computing devices programmed to generate a random numeric or alphanumeric code at the charging station when charging is requested therefrom by a user and when the charging station is off-line from the charging network server, the random numeric or alphanumeric code being displayed to the user. The computing devices are also programmed to transmit the random numeric or alphanumeric code from the mobile device application to the charging network server as part of a charging authorization request, with the authorization code being stored on each of the network server and the charging station. The computing devices are further programmed to process a charging authorization request at the charging network server sent from the mobile device application that includes the random numeric or alphanumeric code therein, with the charging network server running an algorithm on the random numeric or alphanumeric code included in the charging authorization request to generate an algorithmic output. The computing devices are still further programmed to transmit the algorithmic output from the charging network server to the mobile device application and authorize or deny charging of the electrically powered vehicle at the charging station upon inputting of the algorithmic output into the charging station by the user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charging system for charging an electrically powered vehicle, the charging system comprising:
    a charging station; and
    a charging network server remote from the charging station and in network communication with the charging station and with a mobile device application;
    wherein each of the charging station and the charging network server comprises a computing device configured to store, process, and receive data for authorizing charging of the electrically powered vehicle, the computing devices programmed to:
        store an authorization code at each of the network server and the charging station for authorizing charging of the electrically powered vehicle when the charging station is off-line from the charging network server;
        process a charging authorization request at the charging network server sent from the mobile device application;
        transmit the authorization code from the network server to the mobile device application responsive to the charging authorization request and when the charging station is determined to be off-line from the charging network server; and
        selectively authorize or deny charging of the electrically powered vehicle by the charging station upon inputting of an authorization code to the charging station by a user based on whether the input authorization code matches the authorization code stored on the charging station.

2. The charging system of claim 1 wherein the authorization code comprises one of a numeric code or alphanumeric code.

3. The charging system of claim 2 wherein the charging station comprises a keypad or touchscreen by which the numeric code or alphanumeric code is input to the charging station.

4. The charging system of claim 1 wherein charging of the electrically powered vehicle is authorized when the authorization code input to the charging station matches the authorization code stored on the charging station and charging of the electrically powered vehicle is denied when the authorization code input to the charging station does not match the authorization code stored on the charging station.

5. The charging system of claim 1 wherein the computing device is programmed to:
    tag a transaction ID to the authorization code at the charging station upon authorizing the charging of the electrically powered vehicle; and
    transmit the transaction ID and the authorization code from the charging station back to the network server upon the charging station coming back on-line with the network server.

6. The charging system of claim 1 wherein the charging authorization request comprises charging station identification information and customer account information.

7. The charging system of claim 1 wherein the computing device is programmed to:
    monitor a status of the authorization code to determine a validity thereof;
    monitor for the charging authorization request at the charging network server when it is determined that the authorization code is still valid; and
    generate a new authorization code different from the authorization code when it is determined that the authorization code is no longer valid.

8. The charging system of claim 1 wherein the computing device is programmed to transmit an authorization for charging of the electrically powered vehicle from the charging network server to the charging station when it is determined that the charging station is on-line with the network server at the time the charging authorization request is processed.

9. A method for authorizing charging of an electrically powered vehicle from a charging station via a mobile device application, the method comprising:
    generating an authorization code at a network server remote from a charging station;
    transmitting the authorization code from the network server to the charging station, with the authorization code being stored on each of the network server and the charging station;
    processing a mobile device authorization request at the network server sent from a mobile device application, the mobile device authorization request comprising a request for authorizing charging of an electrically powered vehicle from the charging station;
    performing a check at the network server to determine if the charging station is currently in network communication with the network server;
    sending the authorization code from the network server to the mobile device application when it is determined that the charging station is not currently in network communication with the network server; and
    comparing, at the charging station, an authorization code input to the charging station by a customer to the authorization code stored on the charging station, with charging of the electrically powered vehicle being authorized or denied based on the comparison.

10. The method of claim 9 further comprising:
determining whether the authorization code is still valid at a time subsequent to generation of the authorization code;
monitoring for the mobile device authorization request at the network server when it is determined that the authorization code is still valid; and
generating a new authorization code different from the authorization code when it is determined that the authorization code is no longer valid.

11. The method of claim 10 wherein the authorization code is determined to be no longer valid if a pre-determined amount of time passed since the generation of the authorization code or after a use of the authorization code at the charging station to authorize a charging event.

12. The method of claim 9 further comprising transmitting authorization for charging of the electrically powered vehicle directly from the network server to the charging station when it is determined that the charging station is currently in network communication with the network server.

13. The method of claim 9 wherein the authorization code comprises one of a numeric code or alphanumeric code.

14. The method of claim 13 further comprising inputting the authorization code to the charging station via a keypad or touchscreen on the charging station, with the charging station then comparing the authorization code input via the keypad or touchscreen to the authorization code stored on the charging station.

15. The method of claim 9 further comprising:
tagging a transaction ID to the authorization code at the charging station upon authorizing the charging of the electrically powered vehicle; and
transmitting the transaction ID and the authorization code from the charging station back to the network server upon network communication between the charging station and the network server being reestablished.

16. The method of claim 9 wherein the mobile device authorization request comprises charging station identification information and customer account information.

17. The method of claim 16 further comprising acquiring the charging station identification information via scanning of an optical machine-readable code on the charging station with the mobile device application, the optical machine-readable code comprising one of a QR code and a barcode.

18. A charging system for charging an electrically powered vehicle, the charging system comprising:
a charging station; and
a charging network server remote from the charging station and in network communication with the charging station and with a mobile device application;
wherein each of the charging station and the charging network server comprises a computing device configured to store, process, and receive data for authorizing charging of the electrically powered vehicle, the computing devices programmed to:
generate a random numeric or alphanumeric code at the charging station when charging is requested therefrom by a user and when the charging station is off-line from the charging network server, the random numeric or alphanumeric code being displayed to the user;
transmit the random numeric or alphanumeric code from the mobile device application to the charging network server as part of a charging authorization request, with the authorization code being stored on each of the network server and the charging station;
process a charging authorization request at the charging network server sent from the mobile device application that includes the random numeric or alphanumeric code therein, with the charging network server running an algorithm on the random numeric or alphanumeric code included in the charging authorization request to generate an algorithmic output;
transmit the algorithmic output from the charging network server to the mobile device application; and
authorize or deny charging of the electrically powered vehicle at the charging station upon inputting of the algorithmic output into the charging station by the user.

19. The charging system of claim 18 wherein the computing device is further programmed to:
run the algorithm on the random numeric or alphanumeric code at the charging station upon generating the random numeric or alphanumeric code, with an algorithmic output being generated and stored at the charging station that is identical to the algorithmic output generated at the charging network server; and
upon input by the user to the charging station of the algorithmic output transmitted from the charging network server to the mobile device application, compare the algorithmic output input to the charging station to the algorithmic output stored at the charging station; and
authorize charging of the electrically powered vehicle from the charging station if the algorithmic output input to the charging station matches the algorithmic output stored at the charging station;
otherwise deny charging of the electrically powered vehicle from the charging station if the algorithmic output input to the charging station does not match the algorithmic output stored at the charging station.

20. The charging system of claim 18 wherein the algorithmic output comprises a numeric or alphanumeric code.

* * * * *